United States Patent
Petrisor

(10) Patent No.: US 9,158,185 B2
(45) Date of Patent: Oct. 13, 2015

(54) PERSONAL INTERACTIVE OVERHEAD PROJECTION INFLIGHT ENTERTAINMENT SYSTEM

(71) Applicant: Gregory C. Petrisor, Los Angeles, CA (US)

(72) Inventor: Gregory C. Petrisor, Los Angeles, CA (US)

(73) Assignee: Lumexis Corporation, Irvine, CA (US)

( * ) Notice: Subject to any disclaimer, the term of this patent is extended or adjusted under 35 U.S.C. 154(b) by 92 days.

(21) Appl. No.: 13/735,526

(22) Filed: Jan. 7, 2013

(65) Prior Publication Data

US 2014/0192268 A1 Jul. 10, 2014

(51) Int. Cl.
| | |
|---|---|
| *G03B 21/14* | (2006.01) |
| *G03B 33/10* | (2006.01) |
| *H04N 9/31* | (2006.01) |
| *B60Q 3/02* | (2006.01) |
| *G06F 3/01* | (2006.01) |
| *G06F 3/0488* | (2013.01) |

(52) U.S. Cl.
CPC ............ *G03B 21/147* (2013.01); *B60Q 3/0253* (2013.01); *G03B 33/10* (2013.01); *G06F 3/017* (2013.01); *H04N 9/3194* (2013.01); *G06F 3/0488* (2013.01)

(58) Field of Classification Search
CPC ...... G03B 21/00; G03B 21/14; G03B 21/145; G03B 21/147; G03B 33/10; B60Q 1/26; B60Q 1/2615; B60Q 1/2661; B60Q 3/0246; B60Q 3/0253; B60Q 2900/00; H04N 9/31; H04N 9/3194; G06F 3/017

USPC ..................... 353/13, 69–70, 94; 725/76–77
See application file for complete search history.

(56) References Cited

U.S. PATENT DOCUMENTS

| | | | | |
|---|---|---|---|---|
| 4,511,178 A * | 4/1985 | Brennan | ........... | 297/146 |
| 6,072,444 A * | 6/2000 | Burns | ........... | 345/7 |
| 6,281,878 B1 * | 8/2001 | Montellese | ........... | 345/156 |
| 6,431,711 B1 * | 8/2002 | Pinhanez | ........... | 353/69 |
| 6,611,252 B1 * | 8/2003 | DuFaux | ........... | 345/168 |
| 6,964,481 B2 * | 11/2005 | Pho et al. | ........... | 353/12 |
| 8,382,289 B2 * | 2/2013 | Hikosaka | ........... | 353/69 |
| 8,388,151 B2 * | 3/2013 | Huebner | ........... | 353/119 |
| 8,461,505 B2 * | 6/2013 | Budinger et al. | ........... | 250/208.1 |
| 8,485,666 B2 * | 7/2013 | Cho | ........... | 353/13 |
| 8,789,954 B1 * | 7/2014 | Atkins et al. | ........... | 353/119 |
| 2008/0024463 A1 * | 1/2008 | Pryor | ........... | 345/175 |
| 2010/0060857 A1 * | 3/2010 | Richards et al. | ........... | 353/7 |
| 2011/0095911 A1 * | 4/2011 | Babst et al. | ........... | 340/945 |
| 2012/0292986 A1 * | 11/2012 | Riedel et al. | ........... | 307/9.1 |

\* cited by examiner

*Primary Examiner* — Jori S Reilly-Diakun
(74) *Attorney, Agent, or Firm* — Scot A. Reader

(57) ABSTRACT

In a personal interactive overhead projection IFE system, an overhead projector associated with a passenger's seat projects video onto a passive substrate attached to the seat. The passive substrate may be a tray table or a dedicated video projection screen. The passenger sitting in the seat controls the projected video by positioning his or her finger or making hand gestures proximate the passive substrate. An overhead camera records the hand actions. An overhead processor interprets the hand actions and controls the projected video based on the hand actions. The system provides highly desirable personal and interactive features while obviating the need for seatback video display units or passenger control units.

19 Claims, 4 Drawing Sheets

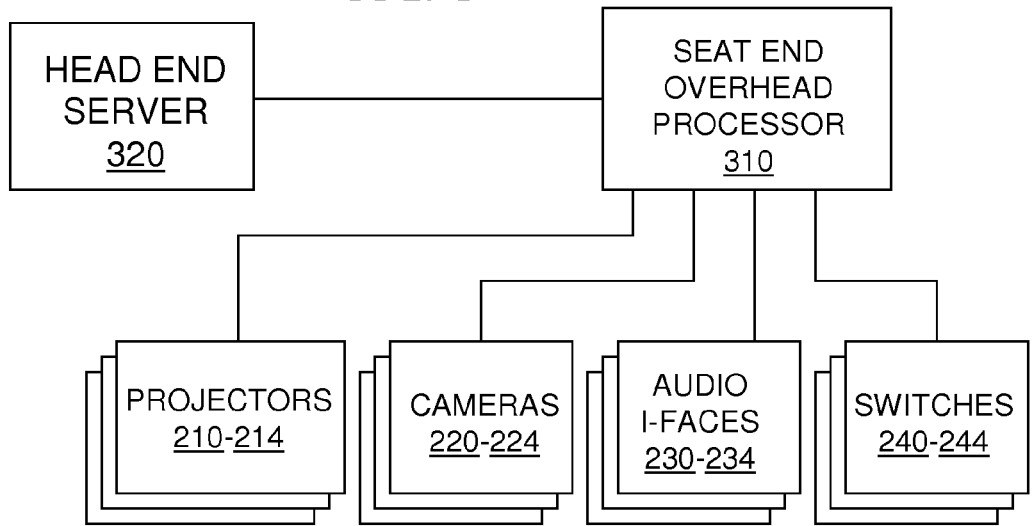
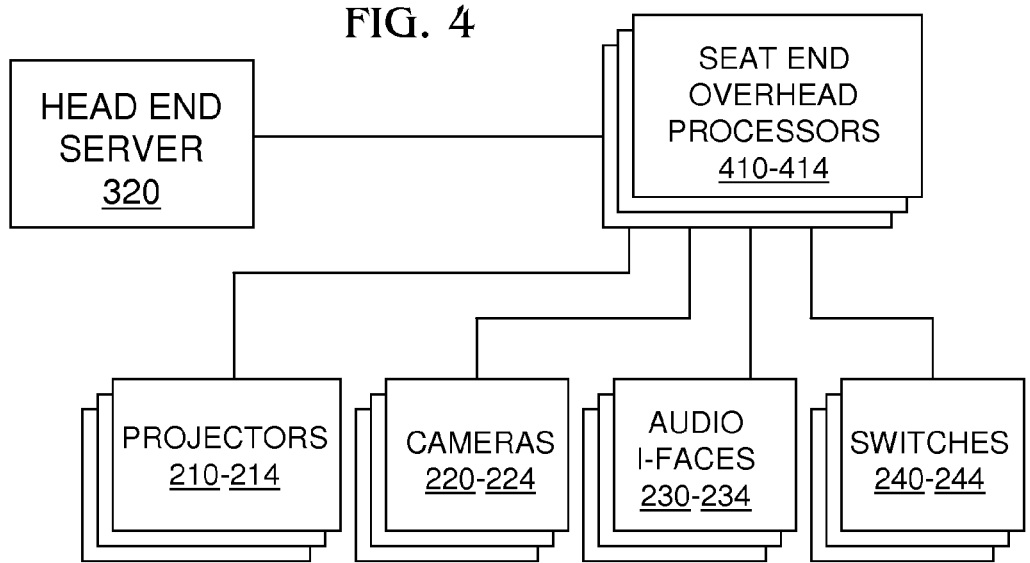

PERSONAL INTERACTIVE OVERHEAD PROJECTION INFLIGHT ENTERTAINMENT SYSTEM

BACKGROUND OF THE INVENTION

The present invention relates to inflight entertainment (IFE) systems and, more particularly, to personal interactive IFE systems.

Personal interactive IFE systems have become an important part of air travel. In conventional personal interactive IFE systems, a seatback video display unit (VDU) is mounted in the seat in front of each passenger and the passenger controls the video displayed on the VDU either by making finger inputs on a passenger control unit (PCU) mounted in the passenger's armrest or on the VDU's touch screen.

These conventional personal interactive IFE systems experience several problems. First, providing each passenger his or her own seatback VDU adds considerable weight to the aircraft. Second, installing and maintaining seatback VDUs is time consuming and costly, since a functioning seatback VDU must be individually mounted in each seat and individually connected to a content server at the head end of the aircraft. Third, seatback VDUs (and PCUs where used) are subject to frequent breakage due to abuse and misuse by passengers. Fourth, seatback VDUs create head-strike risks when an aircraft experiences unexpected motion due to turbulence or a hard landing. Fifth, in the case of touch screen seatback VDUs, some passengers have difficulty reaching the touch screen.

SUMMARY OF THE INVENTION

The present invention provides a personal interactive overhead projection IFE system. In the proposed system, an overhead projector associated with a passenger's seat projects video onto a passive seatback mounted substrate. The passive seatback mounted substrate may be a tray table attached to the seat. Alternatively, the passive seatback mounted substrate may be a dedicated video projection screen. The passenger sitting in the seat controls the projected video by positioning his or her finger or making hand gestures proximate the passive seatback mounted substrate. An overhead camera records the hand actions. An overhead processor interprets the hand actions and controls the projected video based on the hand actions. Where the passive seatback mounted substrates are tray tables, the invention converts tray tables widely deployed on commercial aircraft into full motion video screens that allow each passenger to select and view their own preferred content, obviating the need for seatback VDUs and PCUs. Where the passive seatback mounted substrates are dedicated video projection screens, the invention also obviates the need for seatback VDUs and PCUs. In either case, this yields considerable savings relative to conventional personal interactive IFE systems in terms of aircraft weight, installation and maintenance; reduces head-strike risks; and eliminates the difficulty some passengers have reaching seatback VDU touch screens.

The overhead projector may double as an overhead reading light. The passenger may regulate a switch to transition the overhead projector between an overhead video projection function, an overhead reading light function and an off state (i.e., where nothing is emitted from the overhead projector). The switch may be an overhead switch or an armrest switch. Alternatively, the passenger may transition the overhead projector between the overhead video function, the overhead reading light function and the off state by positioning his or her finger or making a hand gesture proximate the passive seatback mounted substrate. In that event, the overhead camera may record the hand action and the overhead processor may set the state of the overhead projector based on the hand action. The "dual use" overhead projector/reading light supports a full motion video projector within the existing form factor for overhead reading lights deployed on commercial aircraft.

The overhead processor may distort the projected video to optimize the projected video for different positions of the passive seatback mounted substrate. The overhead processor may apply a predetermined distortion based on an expected position of the passive seatback mounted substrate. The overhead processor may apply a dynamically determined distortion based on an actual position of the passive seatback mounted substrate. The overhead processor may select the dynamically determined distortion based on visual cues in a recording taken by the overhead camera.

The overhead processor may size the projected video to optimize the projected video for different positions of the passive seatback mounted substrate and different cabin lighting. The overhead processor may select a predetermined size based on an expected position of the passive seatback mounted substrate and expected cabin lighting. The overhead processor may select a dynamically determined size based an actual position of the passive seatback mounted substrate and actual cabin lighting. The overhead processor may select the dynamically determined size based on visual cues in a recording taken by the overhead camera.

The personal interactive overhead projection IFE system may polarize the projected video for three dimensional viewing by alternating polarizations on a single projector or, alternatively, using a different projector for each of the two polarizations.

Where the passive seatback mounted substrate is a tray table, the tray table may be equipped with a cover. The cover may be white in color and may cover rises and voids in the tray table to improve the visual quality of the projected video.

Where the passive seatback mounted substrate is a tray table, the tray table may be equipped with side flaps. The side flaps may extend upward from the sides of the tray table to block cabin light and improve the visual quality of the projected video.

The personal interactive overhead projection IFE system may include an overhead audio interface. Alternatively, the audio interface may be an armrest audio interface. The audio interface may output synchronous audio for the projected video over a wired or wireless connection.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 3 shows a personal interactive overhead projection IFE system infrastructure wherein an overhead processor is shared by a seat group.

FIG. 4 shows a personal interactive overhead projection IFE system infrastructure wherein each seat has a dedicated overhead processor.

DETAILED DESCRIPTION OF A PREFERRED EMBODIMENT

Figure 1:
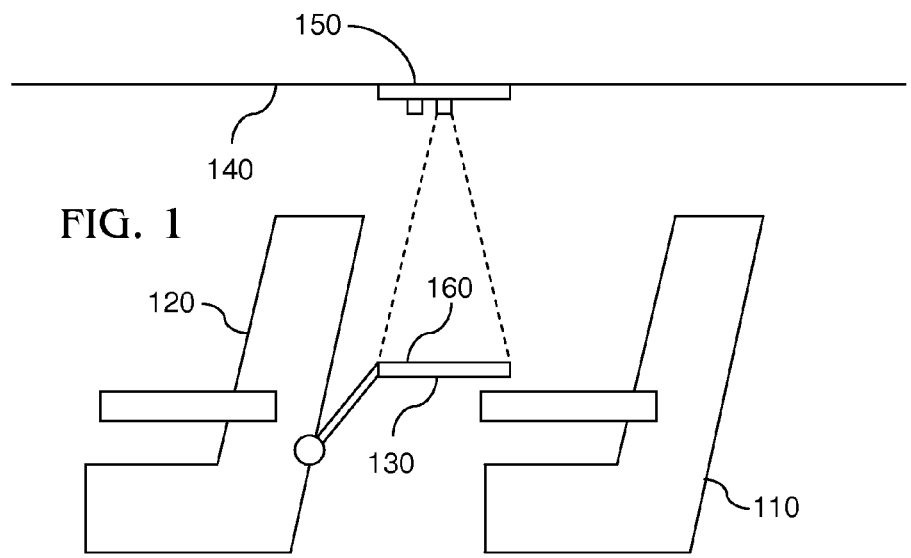
FIG. 1 shows a personal interactive overhead projection IFE system wherein a tray table is used to display projected video.

FIG. 1 shows a personal interactive overhead projection IFE system wherein a tray table is used to display projected video. The system is used by a passenger sitting in a seat 110 during a plane flight. The system includes a tray table 130 attached to a seat 120 that is directly in front of the seat 110 occupied by the passenger who is using the system. Tray table 130 is a passive substrate that cannot generate images internally but can display projected images that are generated externally. The system further includes an overhead panel 150 mounted to an overhead section 140 of the aircraft. In operation, the passenger in seat 110 releases tray table 130 by hand from a locked upright position and tray table 130 drops into an unlocked horizontal position. Personalized entertainment video, such as movies, prerecorded television (TV) shows, live TV, video games and web sites, is then projected on the upper surface 160 of tray table 130, which serves as a viewing surface for the projected video. Synchronous audio is provided to the passenger via an audio interface. The passenger sitting in seat 110 controls the projected video and the synchronous audio by positioning his or her finger or making hand gestures on or over designated areas of the projected video in the vicinity of the tray table.

Figure 2:
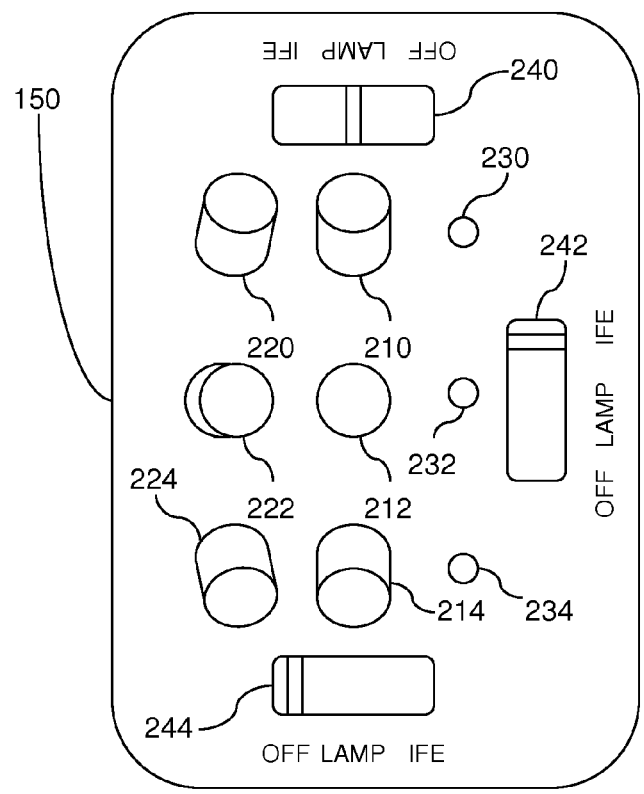
FIG. 2 shows an overhead panel for a personal interactive overhead projection IFE system.

FIG. 2 shows overhead panel 150 in more detail. Panel 150 houses components of the personal IFE systems of three adjacent seats (e.g., window, center, aisle) in a single row of an aircraft. Panel 150 is mounted to the overhead section 140 of the aircraft above the row of seats generally above the center seat. Components on panel 150 include overhead projectors 210, 212, 214, overhead cameras 220, 222, 224, overhead audio interfaces 230, 232, 234 and overhead switches 240, 242, 244 for the three adjacent seats. Window seat projector 210, window seat camera 220, window seat audio interface 230 and window seat switch 240 belong to the personal IFE system for the window seat; center seat projector 212, center seat camera 222, center seat audio interface 232 and center seat switch 242 belong to the personal IFE system for the center seat; and aisle seat projector 214, aisle seat camera 224, aisle seat audio interface 234 and aisle seat switch 244 belong to the personal IFE system for the aisle seat.

Turning now to FIG. 3, a personal interactive overhead projection IFE system infrastructure is shown wherein an overhead processor is shared by a seat group. Overhead projectors 210, 212, 214, cameras 220, 222, 224, audio interfaces 230, 232, 234 and switches 240, 242, 244 are communicatively coupled with a seat end overhead processor 310 housed in overhead section 140 of the aircraft. Processor 310 is in turn communicatively coupled with a head end server 320. In a basic operation, processor 310 receives inputs from passengers via cameras 220, 222, 224 and switches 240, 242, 244; accesses from head end server 320, based on the inputs, entertainment (and system management) video and synchronous audio requested by the passengers; projects via projectors 210, 212, 214 the entertainment (and system management) video on the tray tables; and outputs via audio interfaces 230, 232, 234 the synchronous audio.

FIG. 4 shows an alternative personal interactive overhead projection IFE system infrastructure wherein each seat in a seat group has its own overhead processor. In this system, window seat overhead processor 410 is dedicated to the window seat; center seat overhead processor 412 is dedicated to the center seat; and aisle seat overhead processor 414 is dedicated to the aisle seat.

Various components of the personal interactive overhead projection IFE system and their operational roles will now be discussed in even greater detail.

Projectors 210, 212, 214 project personalized entertainment video, such as movies, prerecorded TV shows, live TV, video games and web pages onto the tray tables of their respective passengers. Projectors 210, 212, 214 also project system management video (e.g., navigation tools, search tools, video selection menus, payment screens, volume controls, etc.) onto the tray tables of their respective passengers. Entertainment video and system management video may be projected simultaneously or at different times. Projectors 210, 212, 214 are oriented within panel 150 to project onto the tray tables of their respective passengers.

Cameras 220, 222, 224 record the projected video on the tray tables of their respective passengers and hand actions made by their respective passengers proximate the tray tables. Passengers control the projected video by positioning their fingers or making hand gestures on or over system management elements at designated areas of the projected video proximate the tray tables. Cameras 220, 222, 224 record these hand actions. Processor 310 interprets the hand actions and controls the video projected by projectors 210, 212, 214 based on the hand actions. Cameras 220, 222, 224 are oriented on panel 150 to record the projected video and hand actions proximate the tray tables of their respective passengers.

As an example, window seat projector 210 may project a first page of a content selection menu on a window seat tray table. The passenger sitting in the window seat may then move his finger on or over a "next page" button on the first page. Window seat camera 220 records the finger position. Processor 310 interprets the recorded finger position as the passenger's selection of the "next page" button and executes a control instruction causing head end server 320 to deliver and window seat projector 210 to project the second page of the content selection menu on the window seat tray table.

In some embodiments, cameras 220, 222, 224 are visible spectrum video cameras. In these embodiments, cameras 220, 222, 224 record visible image sequences in their field of view and processor 310 executes pattern recognition software to identify hand actions in the recorded sequences.

In some embodiments, cameras 220, 222, 224 are infrared cameras. In these embodiments, cameras 220, 222, 224 record thermal image sequences in their field of view and processor 310 executes pattern recognition software to identify hand actions in the recorded sequences.

In some embodiments, each personal IFE system has multiple overhead cameras (i.e., two or more cameras per passenger). Using multiple cameras adds depth perception to the personal IFE system, improves accuracy of hand action identification and avoids system outages caused by a blockage or malfunction of a single camera.

Processor 310 in combination with projectors 210, 212 and 214 distorts the projected video to optimize the projected video for different tray table positions. Processor 310 in combination with projectors 210, 212 and 214 applies predetermined distortions based on expected positions of tray tables. For example, the window seat tray table has an expected distance from window seat projector 210 when in the unlocked horizontal position. Moreover, the window seat tray table can be expected to be at an angular offset relative to window seat projector 210 when in the horizontal position. Accordingly, processor 310 in combination with projector 210 may apply predetermined distortions to correct for these expectancies and improve the visual quality of the projected content.

Figure 5:
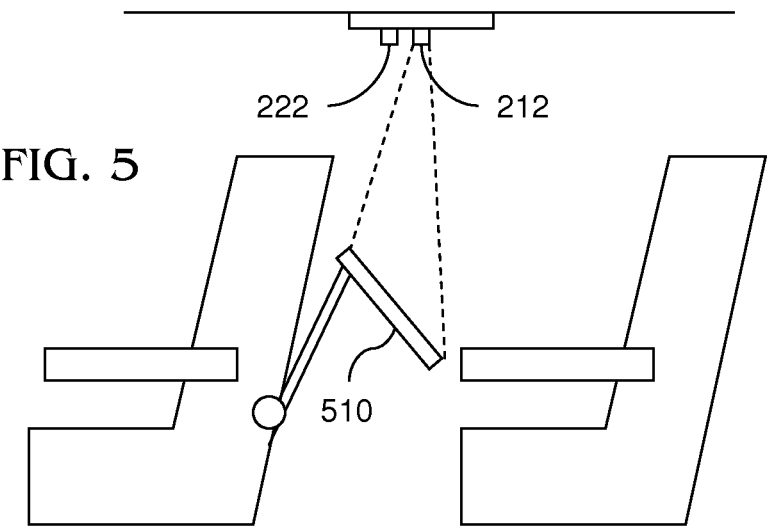
FIG. 5 shows a personal interactive overhead projection IFE system where the tray table is tilted forward to face the passenger.
Figure 6:
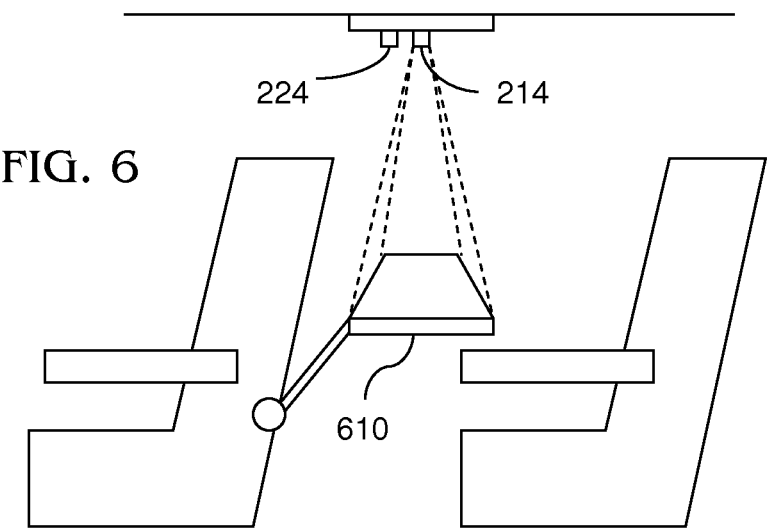
FIG. 6 shows a personal interactive overhead projection IFE system where the tray table is tilted sideways to face the overhead projector.

Furthermore, processor 310 in combination with projectors 210, 212 and 214 applies dynamically determined distortions to optimize the projected video based on the actual positions of the tray tables. Consider FIG. 5, which shows a situation where the center seat tray table 510 has been tilted by a passenger for ease of viewing. The tilt leaves center seat tray table 510 at a distance and angular offset relative to center seat projector 212 that are different than when center seat tray table 510 is in the expected horizontal position. Center seat camera 222 records the tray table position and processor 310, in combination with projector 210, based on visual cues in the recording, selects and applies dynamically determined distortions to adjust for the disparity. Consider also FIG. 6, which shows a situation where the aisle seat tray table 610 has been tilted leftward to face aisle seat projector 214. The leftward tilt reduces the expected angular offset of aisle seat tray table 610 relative to aisle seat projector 214 when aisle seat tray table 610 is in the expected horizontal position. Aisle seat camera 224 records the tray table position and processor 310, in combination with projector 214, based on visual cues in the recording, selects and applies dynamically determined distortions to adjust for the disparity.

Processor 310 also sizes the projected video to optimize the projected video for different positions of the tray tables and different cabin lighting. Processor 310 selects predetermined sizes based on expected positions of the tray tables and expected cabin lighting. Processor 310 selects dynamically determined sizes based actual positions of the tray tables and actual cabin lighting. Processor 310 selects dynamically determined sizes based on visual cues in recordings taken by cameras 220, 222, 224.

In some embodiments, two or more projectors are used to project video onto the tray table of a single passenger.

In these embodiments, processor 310 may control the polarization of the projected video for three dimensional viewing. This may be done by temporally alternating the polarization on a single projector or, alternatively, using two projectors in parallel for each of the two polarizations.

Projectors 210, 212, 214 may double as overhead reading lights. Passengers control whether their one of projectors 210, 212, 214 projects video, serves as a reading light or is off by regulating the state of their one of switches 240, 242, 244. For example, in FIG. 2, the passenger sitting in the center seat has set switch 242 to "IFE" such that center seat projector 212 currently projects video. On the other hand, the passengers sitting in the window and aisle seats of the same row have set their switches 240, 244 to "LAMP" and "OFF", respectively, such that window seat projector 210 currently serves as an overhead reading light and aisle seat projector 214 currently is off. Processor 310 interprets the switch states and controls the states of projectors 210, 212, 214 based on the switch states.

In some embodiments, the OFF/LAMP/IFE switches may be mounted in the armrests of passenger seats rather than overhead.

In some embodiments, communications between the OFF/LAMP/IFE switches and the overhead panel are conducted via wireless interfaces, such as Bluetooth interfaces.

In some embodiments, passengers select the state of projectors 210, 212, 214 state by positioning their fingers or making hand gestures in the field of view of cameras 220, 222, 224. In these embodiments, cameras 220, 222, 224 are operative regardless of the current state of projectors 210, 212, 214 and record these hand actions. Processor 310 interprets the hand actions and controls the state of projectors 210, 212, 214 based on the hand actions.

Audio interfaces 230, 232, 232 output audio to headphones plugged into audio interfaces 230, 232, 234. The audio outputted via audio interfaces 230, 232, 234 is synchronized with the projected video outputted by projectors 210, 212, 214, respectively.

In some embodiments, the audio interfaces are mounted in the armrests of passenger seats rather than overhead.

In some embodiments, the auto interfaces are wireless interfaces, such as Bluetooth interfaces.

Figure 7:
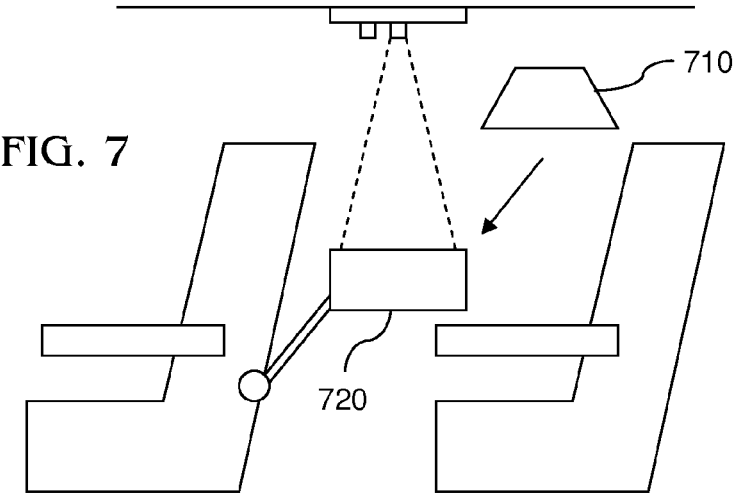
FIG. 7 shows a personal interactive overhead projection IFE system where the tray table is equipped with a cover and side flaps.

Turning to FIG. 7, a personal interactive overhead projection IFE system where the tray table is equipped with a cover 710 and side flaps 720 is shown. Cover 710 is white in color and covers rises and voids in the tray table (e.g., cup stabilizers) to improve the visual quality of the projected video. Cover 710 may be a removable plastic or rubber skin that wraps-around the tray table and is held in place by hook and loop fasteners (e.g., Velcro®) or buttons, a removable plastic or rubber pad that rests on the top of tray table, or a sheet of paper.

Side flaps 720 extend upward from the perimeter of the tray table to block cabin light and improve the visual quality of the projected video. Side flaps 720 may be made of plastic and may slide into slots on the tray table or be otherwise detachably mounted.

Figure 8:
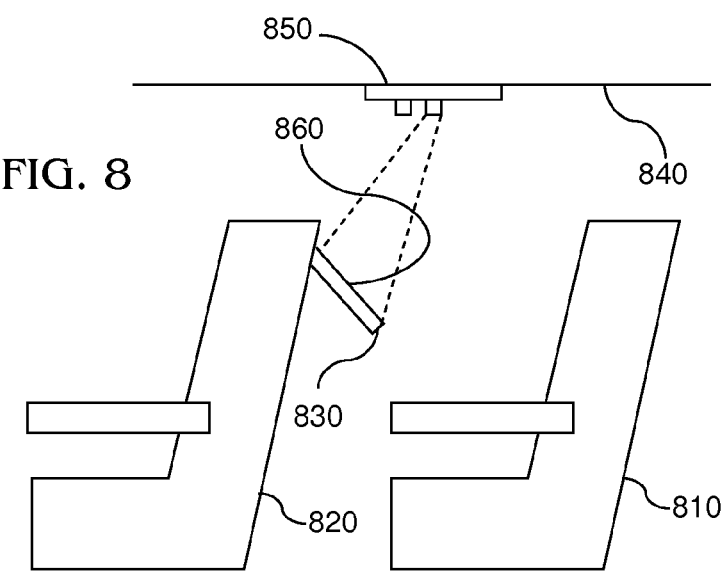
FIG. 8 shows a personal interactive overhead projection IFE system wherein a dedicated video projection video screen is used to display projected video.

FIG. 8 shows a personal interactive overhead projection IFE system wherein a dedicated video projection screen is used to display projected video. The system is used by a passenger sitting in a seat 810 during a plane flight. The system includes a dedicated video projection screen 830 attached to a seat 820 that is directly in front of the seat 810 occupied by the passenger who is using the system. Screen 830 is a passive substrate that cannot generate images internally but can display projected images that are generated externally. The system further includes an overhead panel 850 mounted to an overhead section 840 of the aircraft. In operation, the passenger in seat 810 releases screen 830 and locks screen 830 into position for viewing. Personalized entertainment video, such as movies, prerecorded TV shows, live TV, video games and web sites, is then projected on the upper surface 860 of screen 830, which serves as a viewing surface for projected video. Synchronous audio is provided to the passenger via an audio interface. The passenger sitting in seat 810 controls the projected video and the synchronous audio by positioning his or her finger or making hand gestures on or over designated areas of the projected video in the vicinity of screen 830.

It will be appreciated by those of ordinary skill in the art that the invention can be embodied in other specific forms without departing from the spirit or essential character hereof. For example, the invention encompasses various methods for providing inflight entertainment using the described IFE system, such as method for providing inflight entertainment comprising the steps of mounting a passive substrate to a seatback on an aircraft, mounting an overhead projector to an overhead section of the aircraft and projecting video from the overhead projector onto the substrate. The present description is thus considered in all respects to be illustrative and not restrictive. The scope of the invention is indicated by the appended claims, and all changes that come with in the meaning and range of equivalents thereof are intended to be embraced therein.

What is claimed is:

1. A personal interactive overhead projection inflight entertainment system, comprising:
   a seat-mounted tray table adjustable between a non-deployed position and a multiple of deployed positions;
   an overhead projector configured to project video onto the tray table in any of the deployed positions;
   an overhead camera configured to record the tray table in any of the deployed positions; and
   an overhead processor configured to determine from a recording made by the overhead camera current deployed position data for the tray table and further determine, using the current deployed position data, a distortion to be applied to video projection images which improves visual quality of the video projection images as displayed on the tray table, whereupon the distortion is applied to the video projection images and the video projection images are projected by the overhead projector onto the tray table.

2. The system of claim 1, wherein a passenger controls the video projection images at least in part by hand actions at designated areas of the video projection images proximate the tray table.

3. The system of claim 2, wherein the overhead processor is further configured to interpret the hand actions and control the video projection images based at least in part on the hand actions.

4. The system of claim 2, wherein the overhead camera is further configured to record the hand actions.

5. The system of claim 4, wherein the overhead camera comprises a visible spectrum camera.

6. The system of claim 4, wherein the overhead camera comprises an infrared camera.

7. The system of claim 1, wherein the overhead projector doubles as an overhead reading light.

8. The system of claim 7, further comprising a switch configured to allow a passenger to transition the overhead projector between an overhead video projection function and an overhead reading light function.

9. The system of claim 1, wherein the overhead processor is further configured to determine a size for the video projection images using the current deployed position data.

10. The system of claim 9, wherein the overhead processor is further configured to determine the size using visual cues from the recorded image regarding cabin lighting.

11. The system of claim wherein the tray table is equipped with a cover.

12. The system of claim 1, wherein the tray table is equipped with side flaps.

13. The system of claim 1, further comprising an overhead audio interface configured to output synchronous audio for the projected video.

14. The system of claim 1, wherein the overhead projector comprises a multiple of overhead projectors.

15. The system of claim 14, wherein the overhead processor is further configured to polarize output of each of the overhead projectors to orthogonal polarization for three dimensional viewing.

16. The system of claim 1, wherein the deployed positions comprise a horizontal position and a tilted position.

17. A method for providing personal interactive overhead projection inflight entertainment, comprising:
   providing a seat-mounted tray table adjustable between a non-deployed position and a multiple of deployed positions;
   providing an overhead projector positioned to project video onto the tray table in any of the deployed positions;
   providing an overhead camera positioned to record the tray table in any of the deployed positions;
   recording, by the overhead camera, the tray table;
   determining, by an overhead processor, from a recording made by the overhead camera, current deployed position data for the tray table;
   determining, by the overhead processor, using the current deployed position data, a distortion to be applied to video projection images which improves visual quality of the video projection images as displayed on the tray table;
   causing, by the overhead processor, the distortion to be applied to the video projection images; and
   projecting, by the overhead projector, the video projection images onto the tray table.

18. The method of claim 17, wherein the multiple of deployed positions comprise a horizontal position and a tilted position.

19. A method for providing personal interactive overhead projection inflight entertainment, comprising:
   providing a seat-mounted tray table adjustable between a non-deployed position and a multiple of deployed positions;
   providing an overhead projector positioned to project video onto the tray table in any of the deployed positions;
   providing an overhead camera positioned to record the tray table in any of the deployed positions;
   recording, by the overhead camera, the tray table;
   determining, by an overhead processor, from a recording made by the overhead camera, current deployed position data for the tray table including distance data and tilt angle data;
   determining, by the overhead processor, using the current deployed position data, a distortion to be applied to video projection images which improves visual quality of the video projection images as displayed on the tray table;
   causing, by the overhead processor, the distortion to be applied to the video projection images; and
   projecting, by the overhead projector, the video projection images onto the tray table.

* * * * *

UNITED STATES PATENT AND TRADEMARK OFFICE
CERTIFICATE OF CORRECTION

| | | |
|---|---|---|
| PATENT NO. | : 9,158,185 B2 | Page 1 of 1 |
| APPLICATION NO. | : 13/735526 | |
| DATED | : October 13, 2015 | |
| INVENTOR(S) | : Gregory C. Petrisor | |

It is certified that error appears in the above-identified patent and that said Letters Patent is hereby corrected as shown below:

In the Claims:

Claim 11, column 7, line 51, "claim wherein" is replaced with --claim 1 wherein--.

Signed and Sealed this
Eighth Day of December, 2015

Michelle K. Lee
*Director of the United States Patent and Trademark Office*